(12) United States Patent
Werndorfer et al.

(10) Patent No.: US 7,275,215 B2
(45) Date of Patent: Sep. 25, 2007

(54) SYSTEM AND METHOD FOR MANAGING CONTACTS IN AN INSTANT MESSAGING ENVIRONMENT

(75) Inventors: Scott M. Werndorfer, Brookfield, CT (US); Kevin W. Kurtz, Bethel, CT (US)

(73) Assignee: Cerulean Studios, LLC, Brookfield, CT (US)

( * ) Notice: Subject to any disclaimer, the term of this patent is extended or adjusted under 35 U.S.C. 154(b) by 610 days.

(21) Appl. No.: 10/209,586

(22) Filed: Jul. 29, 2002

(65) Prior Publication Data

US 2004/0017396 A1 Jan. 29, 2004

(51) Int. Cl.
*G06F 3/00* (2006.01)

(52) U.S. Cl. ...................... 715/752; 715/758
(58) Field of Classification Search .......... 345/752; 715/752, 758
See application file for complete search history.

(56) References Cited

U.S. PATENT DOCUMENTS

| | | | |
|---|---|---|---|
| 5,689,718 A | 11/1997 | Sakurai et al. | |
| 5,694,616 A * | 12/1997 | Johnson et al. | 709/207 |
| 5,793,771 A * | 8/1998 | Darland et al. | 370/467 |
| 5,812,126 A | 9/1998 | Richardson et al. | |
| 5,812,951 A * | 9/1998 | Ganesan et al. | 455/445 |
| 6,370,597 B1 | 4/2002 | Eady et al. | |
| 6,453,294 B1 | 9/2002 | Dutta et al. | |
| 6,463,078 B1 * | 10/2002 | Engstrom et al. | 370/466 |
| 6,522,333 B1 | 2/2003 | Hatlelid et al. | |
| 6,549,937 B1 * | 4/2003 | Auerbach et al. | 709/206 |
| 6,677,968 B1 * | 1/2004 | Appelman | 715/853 |
| 6,731,308 B1 * | 5/2004 | Tang et al. | 715/751 |
| 6,747,970 B1 * | 6/2004 | Lamb et al. | 370/352 |
| 6,760,754 B1 | 7/2004 | Isaacs et al. | |
| 6,763,226 B1 * | 7/2004 | McZeal, Jr. | 455/90.2 |
| 6,816,578 B1 | 11/2004 | Kredo et al. | |
| 6,876,728 B2 | 4/2005 | Kredo et al. | |
| 6,907,571 B2 | 6/2005 | Slotznick | |
| 6,912,564 B1 * | 6/2005 | Appelman et al. | 709/204 |
| 6,952,805 B1 * | 10/2005 | Tafoya et al. | 715/739 |
| 6,963,839 B1 | 11/2005 | Ostermann et al. | |
| 6,975,988 B1 | 12/2005 | Roth et al. | |

(Continued)

FOREIGN PATENT DOCUMENTS

WO   WO 01/50680 A2   7/2001

(Continued)

OTHER PUBLICATIONS

Bott, Ed; Leonhard, Woody, "Special Edition Using Microsoft Office 2002". Que, 1999.*

(Continued)

*Primary Examiner*—Weilun Lo
*Assistant Examiner*—David Phantana-angkool
(74) *Attorney, Agent, or Firm*—Blakely, Sokoloff, Taylor & Zafman, LLP

(57) ABSTRACT

A computer-implemented method is described for instant messaging comprising: categorizing two or more instant messaging contact names into a single meta contact; receiving a request to transmit an instant message directed to the meta contact; selecting one of the two or more instant messaging contact names within the meta contact to which to transmit the instant message based on a specified prioritization scheme.

18 Claims, 21 Drawing Sheets

U.S. PATENT DOCUMENTS

| | | | |
|---|---|---|---|
| 6,976,092 B1* | 12/2005 | Daniell et al. | 709/246 |
| 6,987,991 B2 | 1/2006 | Nelson | |
| 6,993,594 B2 | 1/2006 | Schneider | |
| 7,016,978 B2* | 3/2006 | Malik et al. | 709/246 |
| 7,035,803 B1 | 4/2006 | Ostermann et al. | |
| 7,039,676 B1 | 5/2006 | Day et al. | |
| 7,043,530 B2 | 5/2006 | Isaccs et al. | |
| 7,047,502 B2* | 5/2006 | Petropoulos et al. | 715/781 |
| 7,089,504 B1 | 8/2006 | Froloff | |
| 7,103,846 B1* | 9/2006 | Shafrir et al. | 715/751 |
| 7,127,685 B2 | 10/2006 | Canfield | |
| 7,143,356 B1* | 11/2006 | Shafrir et al. | 715/751 |
| 7,185,059 B2* | 2/2007 | Daniell et al. | 709/206 |
| 2002/0008703 A1 | 1/2002 | Merrill et al. | |
| 2002/0034281 A1 | 3/2002 | Isaccs et al. | |
| 2002/0138607 A1 | 9/2002 | O'Rourke et al. | |
| 2002/0160757 A1* | 10/2002 | Shavit et al. | 455/414 |
| 2002/0174183 A1 | 11/2002 | Saeidi | |
| 2003/0018726 A1* | 1/2003 | Low et al. | 709/206 |
| 2003/0065721 A1 | 4/2003 | Roskind et al. | |
| 2003/0105822 A1 | 6/2003 | Gusler et al. | |
| 2003/0110450 A1 | 6/2003 | Sakai | |
| 2003/0163525 A1 | 8/2003 | Hendriks et al. | |
| 2003/0182391 A1* | 9/2003 | Leber et al. | 709/217 |
| 2003/0185232 A1 | 10/2003 | Moore et al. | |
| 2003/0229900 A1* | 12/2003 | Reisman | 725/87 |
| 2003/0233650 A1* | 12/2003 | Zaner et al. | 725/32 |
| 2004/0030741 A1 | 2/2004 | Wolton et al. | |
| 2004/0111479 A1 | 6/2004 | Borden et al. | |
| 2004/0139400 A1 | 7/2004 | Allam et al. | |
| 2004/0143763 A1 | 7/2004 | Radatti | |
| 2004/0215728 A1 | 10/2004 | Isaccs et al. | |
| 2005/0010641 A1 | 1/2005 | Staack | |
| 2005/0055416 A1 | 3/2005 | Heikes et al. | |
| 2005/0091328 A1 | 4/2005 | Saeidi | |
| 2005/0149622 A1 | 7/2005 | Kirkland et al. | |
| 2006/0075056 A1 | 4/2006 | Isaacs et al. | |
| 2006/0079293 A1 | 4/2006 | Nelson | |

FOREIGN PATENT DOCUMENTS

| | | |
|---|---|---|
| WO | WO 01/57851 A1 | 8/2001 |
| WO | WO 02/03172 A2 | 1/2002 |

OTHER PUBLICATIONS

Lemmi, "WinHelpline Downloads: Trillian Beta 1". Jul. 4, 2002.*

Jabber, FAQ & User Guide, Mar. 2001, 1-36.*

Fire (Multi-platform instant messaging), Release History, Jun. 2002, 1-4.*

Fire (Multi-platform instant messaging), Version .31 Release Notes, 2002, 1-7.*

Proteus (Multi-platform instant messagin), Release Date: Nov. 2001.*

Isaacs, E., et al., "Hubbub: A sound enhanced mobile instant messenger that supports awareness and opportunistic interactions", pp. 179-186, Paper: I Think, Therefore IM, Minneapolis, Minnesota, USA Apr. 20-25, 2002, vol. No. 4, Issue No. 1. (XP-001099410).

Kharif, O., "The Man Who Brought a :-) to Your Screen" pp. 1-3, Business Week Online, Apr. 23, 2001, Retrieved from the Internet: http://www.businessweek.com/bwdaily/dnflash/apr2001/nf20010423_785.htm> retrieved on May 28, 2004. (XP-002283045).

Anon: "Downloadcenter der WinHelpline.info-Dateilansicht: Trillian 1.0 Beta 1" Online' Jul. 4, 2002 XP002283980. Retrieved from the Internet Jun. 9, 2004, pp. 1-3.

Anon: "Iplanet Instant Messenger Main Window Overview", IPlanet Instant Messenger Main Window, Oct. 2001, pp. 1-5, XP002967199.

* cited by examiner

SYSTEM AND METHOD FOR MANAGING CONTACTS IN AN INSTANT MESSAGING ENVIRONMENT

BACKGROUND

1. Field of the Invention

The invention relates generally to the field of data communication systems. More particularly, the invention relates to an improved system and method for managing a plurality of contacts (i.e., "buddies") in an instant messaging environment.

2. Description of the Related Art

Instant messaging systems provide for live, text-based chat sessions between two or more users. Unlike e-mail, instant messaging requires that all parties be online at the same time. AOL's Instant Messenger ("AIM®"), Microsoft Network Messenger Service ("MSNMS®"), ICQ® and Yahoo! Messenger® are the major instant messaging services.

Instant messaging clients allows users to maintain a list of contacts, often referred to as a "buddy list" or "contact list." A user can send instant messages to any of the people in the user's list, as long as those people are online. Sending a message opens up a small window where the user and the user's buddies can type in messages that both can see.

Most of the popular instant messaging programs provide a variety of supplemental features including, for example, Web links (the ability to share links to Websites); image sharing (the ability to view images stored on a buddy's computer; sound sharing (the ability transmit sounds to a buddy); file sharing (the ability to transmit files to a buddy); audio communication (the ability to use the Internet instead of a phone to actually talk with buddies); and information streaming (streaming of real-time or near-real-time information such as stock quotes and news headlines).

Some of the basic principles associated with an instant messaging session will now be described with respect to FIG. 1. In order to establish an instant messaging session, client computers 102 and 104 operated by end users, must initially connect over a network (e.g., the Internet) to an instant messaging service 100. The client computers 102 and 104 typically establish a connection via a dial up line, cable modem connection or digital subscriber line ("DSL"). Alternatively, the client computers 102 or 104 may be connected to the Internet via a local area network ("LAN") gateway.

In order to communicate with the specified instant messaging service 100, proprietary instant messaging client software must initially be installed on the client computers 102 and 104. For example, if the instant messaging service 100 is AIM, then AOL's proprietary instant messaging client software must be installed. The client software allows the client computers 102 and 104 to communicate with the AIM server using AOL's proprietary instant messaging protocol.

Similarly, other instant messaging services, such as IM service 108, will require different client software installed on client computers 106 and 110. For example, Yahoo's proprietary IM software, which includes built-in support for Yahoo's proprietary IM protocol, must be installed on any client computer that uses Yahoo's IM service. Moreover, the client IM software and associated IM protocols required by each service 100, 108 are not compatible. Client software designed for one service may not be used to connect to a different service.

Once the IM client software is installed, to establish an IM session, the client sends the IM service connection information associated with the client computer (e.g., IP address and port number). The IM service creates a temporary file that contains the connection information for the user and the contacts in the user's buddy list. It then checks to see if any of the contacts in the buddy list are currently logged in.

If the service locates any contacts logged in, it sends the connection information for those contacts back to the client. The IM service also sends the user's connection information to the contacts in the buddy list that are signed on. When the client receives the connection information for a contact in the buddy list, it changes the "status" of that person to "Online." The user may then click on a name of any contact in the buddy list who is online, opening an IM window in which the user may enter an instant message.

Once the users have signed on to the IM service, all subsequent communication may occur directly between the two clients, as indicated by the "direct link" between clients 102 and 104, and clients 106 and 110. However, in some circumstances, IM communication must continue to occur through the instant messaging service 100. For example, if client 104 is behind a firewall, client 102 may not be permitted to establish an IM session with client 104 directly.

When the user goes "offline" the client sends a message to the IM server to terminate the session. The server then sends a message to the clients of each contact in the user's buddy list who are currently online to indicate that the user has logged off. Finally, the IM server deletes the temporary file that contained the connection information for the client (s).

SUMMARY

A computer-implemented method is described for instant messaging comprising: categorizing two or more instant messaging contact names into a single meta contact; receiving a request to transmit an instant message directed to the meta contact; selecting one of the two or more instant messaging contact names within the meta contact to which to transmit the instant message based on a specified prioritization scheme.

BRIEF DESCRIPTION OF THE DRAWINGS

A better understanding of the present invention can be obtained from the following detailed description in conjunction with the following drawings, in which.

DETAILED DESCRIPTION OF PREFERRED EMBODIMENTS

As described above, one of the problems associated with instant messaging is the lack of interoperability between the different instant messaging services. For example, a different, proprietary IM client must be installed for each individual IM service on which the user opens an account. Downloading, installing and coordinating among a plurality of different, incompatible IM clients may consume a significant amount of time and effort on behalf of the user.

Figure 1:
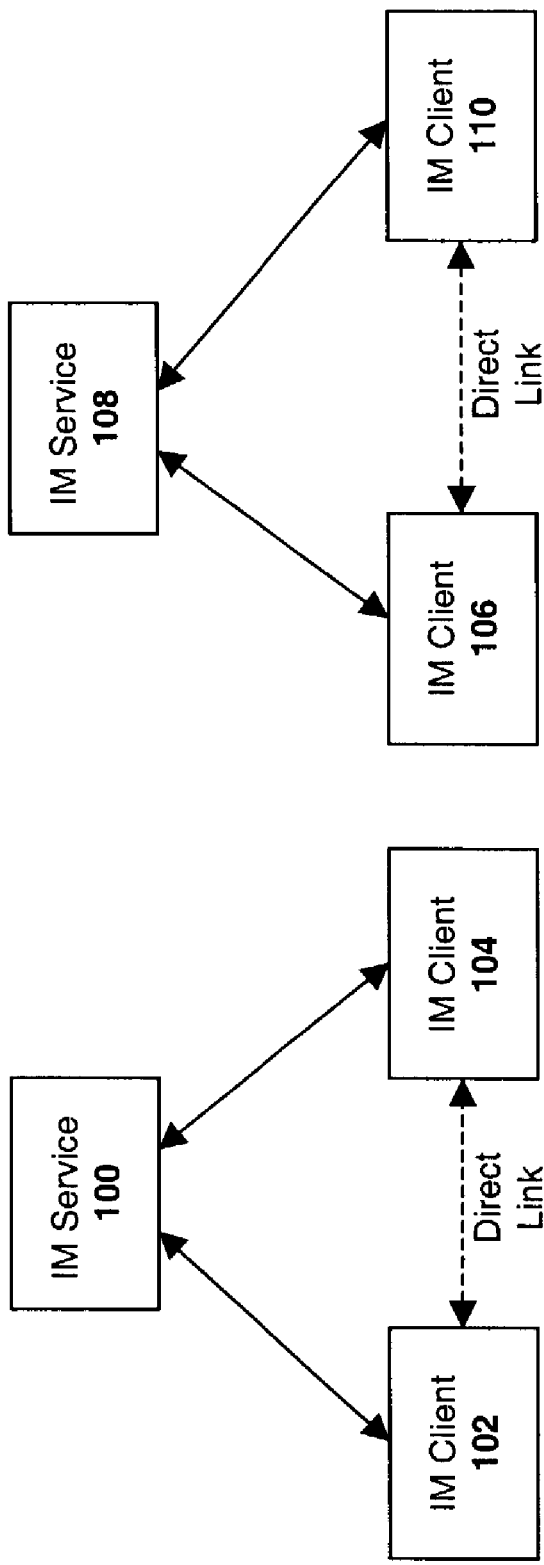
FIG. 1 illustrates the basic principles associated with current instant messaging systems.
Figure 2:
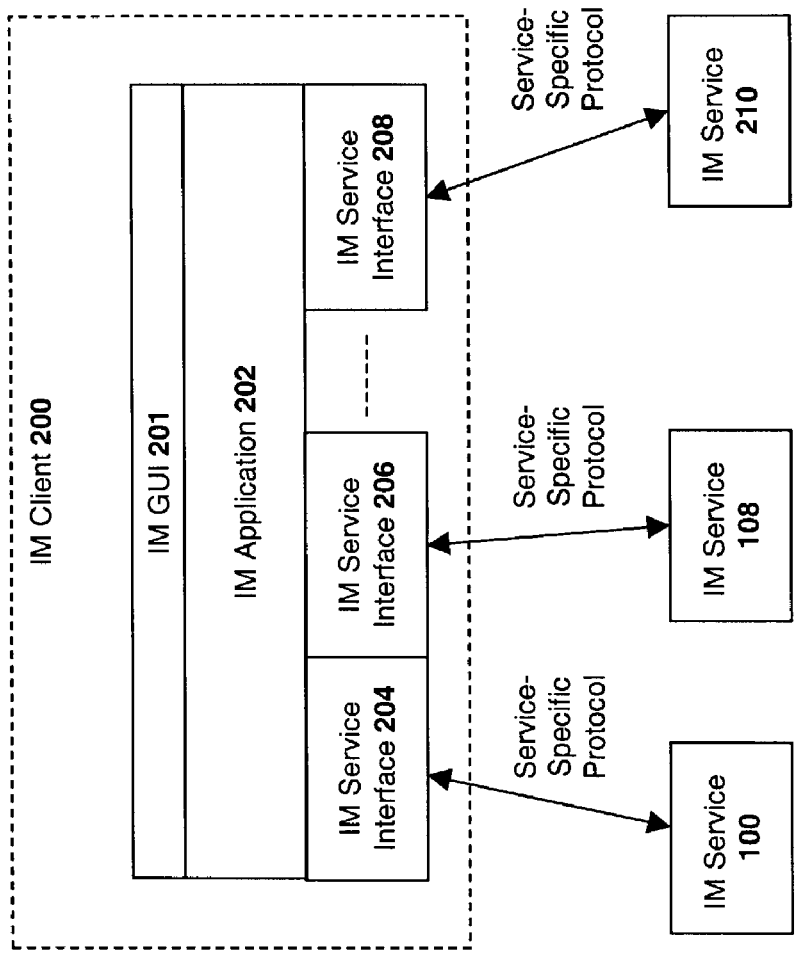
FIG. 2 illustrates an instant messaging client architecture according to one embodiment of the invention.

To solve this and other problems, the assignee of the present application has developed a unified instant messaging client platform which is interoperable with each of the different IM services. Referring to FIG. 2, the IM client platform 200 is comprised generally of an IM application portion 202, which contains standard IM functions used by each IM service 100, 108, 210 (e.g., a buddy list, user-defined online/offline parameters, and other universal IM features described below). Users interact with the IM application 202 via an IM graphical user interface ("GUI") 201, various features of which are described below. Finally, in order to provide interoperability with the different, normally incompatible, IM services, an IM service interface module 204, 206, 208 is provided for each IM service 100, 108, 210, respectively. The IM service interface modules 204, 206, 208 provide service-specific features and communicate with the respective IM services 100, 108, 210 using the IM protocol required by that service. For example, if IM service 100 is AOL, then IM service interface 204 communicates using AOL's proprietary instant messaging protocol. The various service-specific protocols are employed by the IM client 200 transparently to the end user. In sum, the architecture illustrated in FIG. 2 allows a user to access accounts on different instant messaging services using a unified IM application 202 and a consistent graphical user interface 201.

Figure 3:
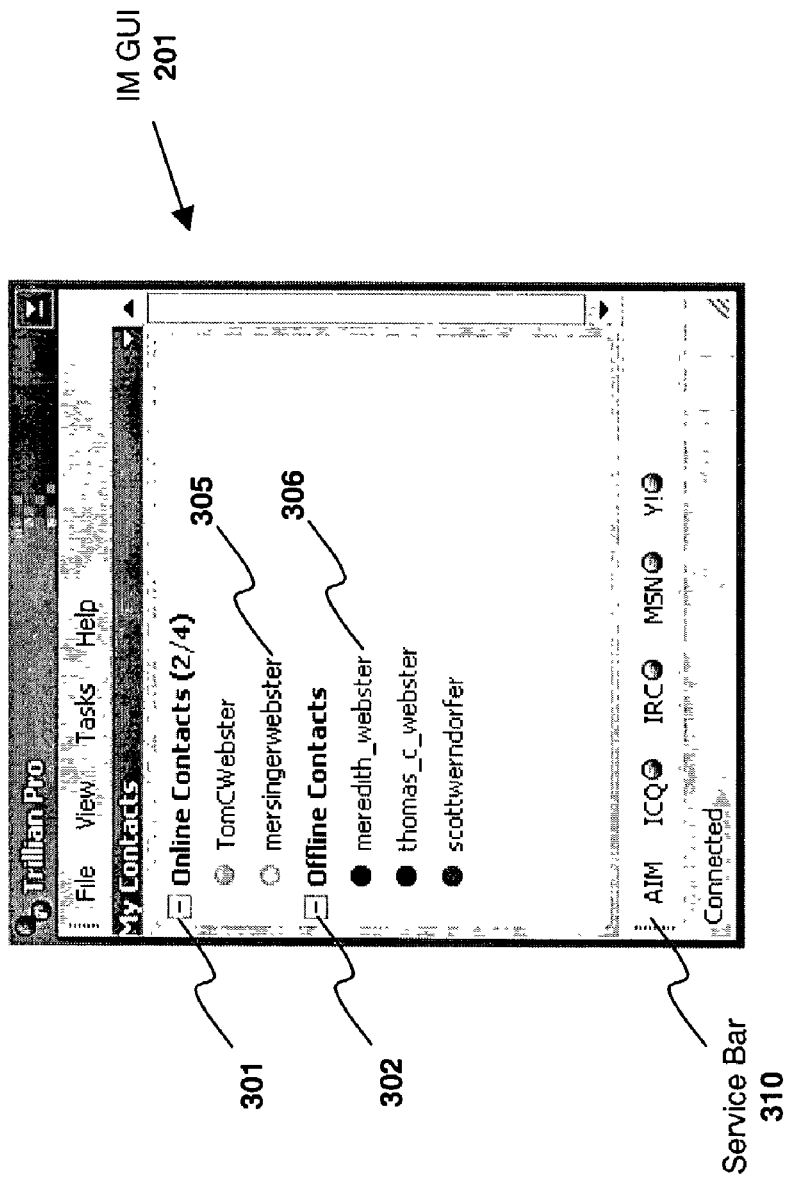
FIG. 3 illustrates an instant messaging GUI according to one embodiment of the invention.

One embodiment of the instant messaging GUI 201 is illustrated in FIG. 3. The GUI 201 is comprised of a buddy list which, like other IM buddy lists, is separated into a list of online contacts 301 and a list of offline contacts 302. Unlike prior buddy lists, however, the buddy lists illustrated in FIG. 3 may include contacts from various different IM services. For example, the contact entries "MerSingerWebster" 305 and "Meredith_Webster" 306 may be screen names for the same individual on different IM services (e.g., AOL and Yahoo). In the particular example shown in FIG. 3, the individual is registered as online on one account (MerSingerWebster 305) and offline for the other account (Meredith_Webster 306).

Figure 4:
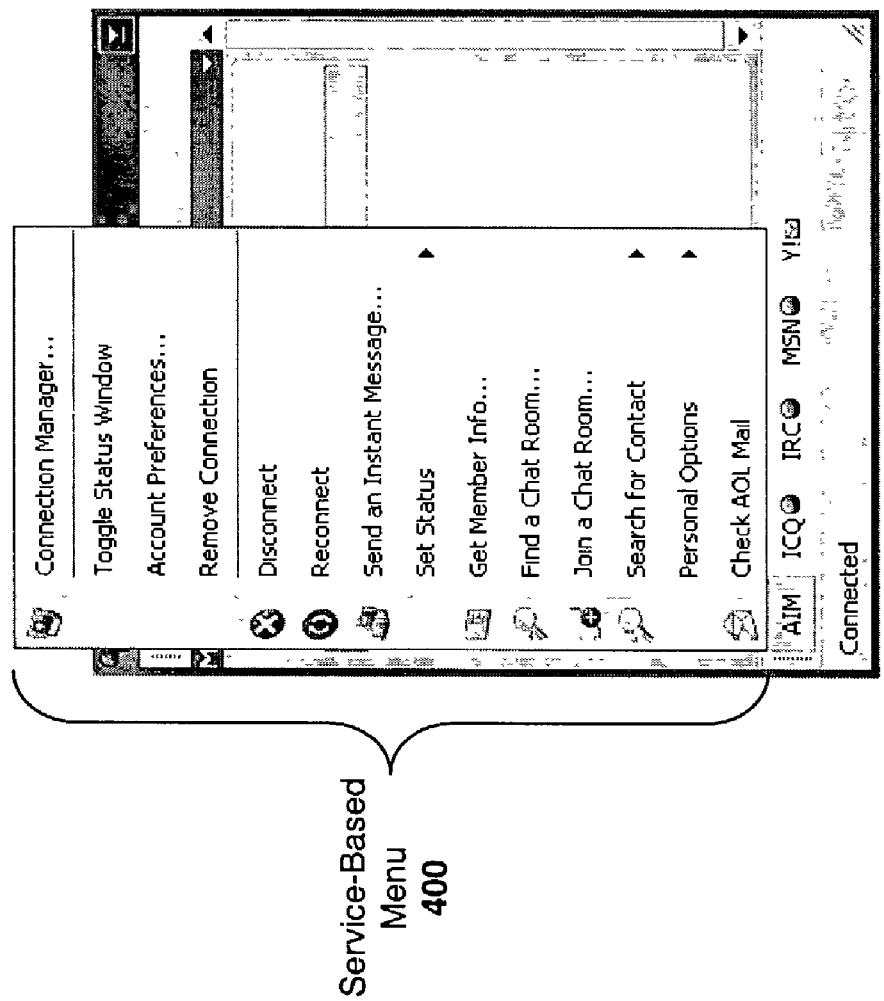
FIG. 4 illustrates a service-based menu according to one embodiment of the invention.

In order to coordinate among the various IM services, a service bar 310 is provided which includes a set of graphical buttons representing each of the different services. The user may connect to a particular service and/or access/modify the features provided by that service by selecting the button corresponding to the service. By way of example, in FIG. 4, the user has selected the AIM button, bringing up a service-based menu 400 which includes settings/preferences for AOL's IM service. The options available on the menu may change from one button to the next, based on the options available for each service.

Figure 5:
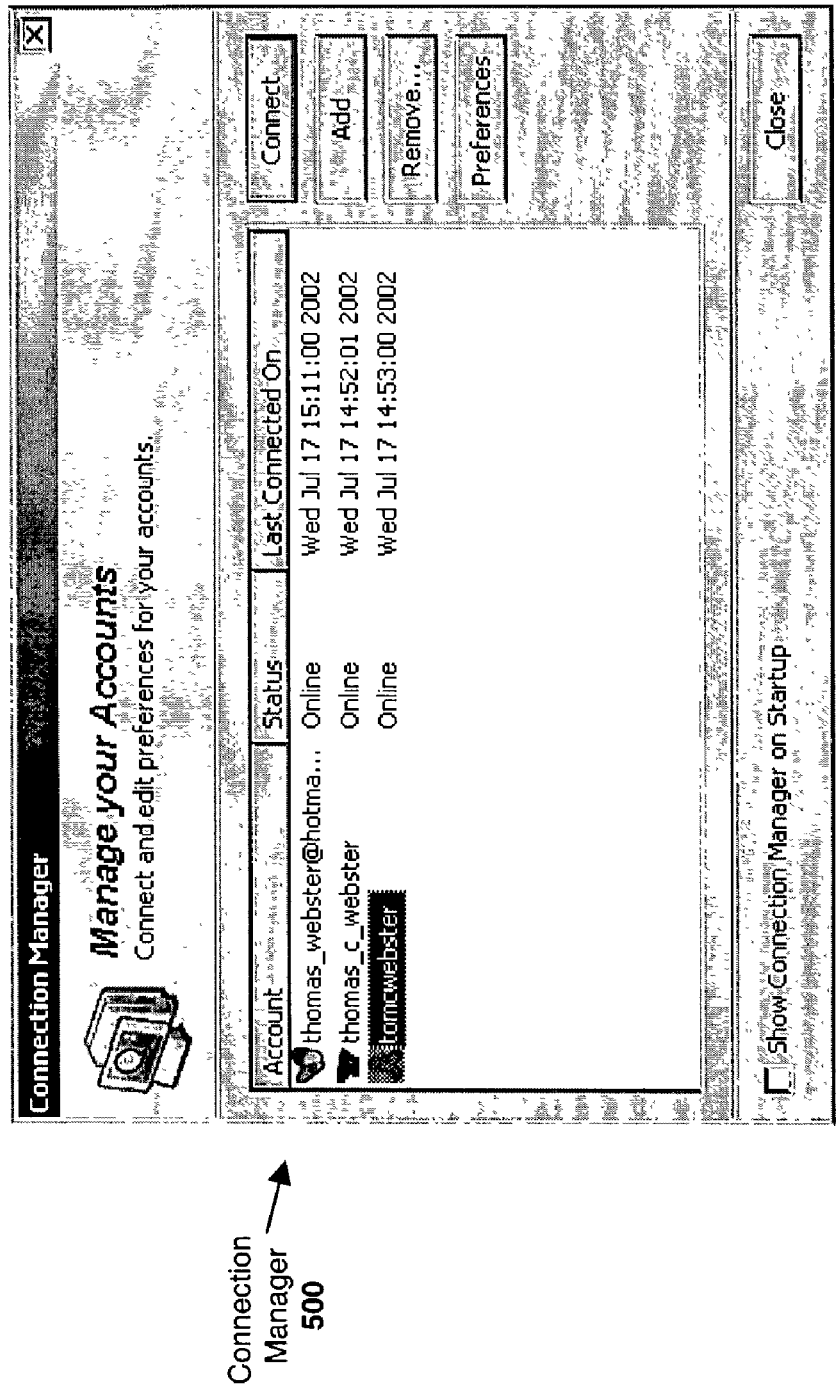
FIG. 5 illustrates a connection manager according to one embodiment of the invention.

The user may connect to multiple services at once, using one or more different screen names. However, in one embodiment, if the user is not logged in to a particular service, the only option which will be provided via the service bar is the "connection manager" option (shown at the top of the menu in FIG. 4). Selecting this option will bring up a connection manager window 500, such as that shown in FIG. 5, which provides a list of all services on which the user has an account. In the particular connection manager window 500 illustrated in FIG. 5, the user has set up accounts for Microsoft, Yahoo! and AOL. From the connection manager window 500, the user may connect to the various IM accounts, add new accounts, delete accounts, and modify preferences for each account.

One embodiment of the GUI 201 provides the user with the option to "globally connect" or "globally disconnect" from each service on which the user has an account, thereby streamlining the process of connecting/disconnecting to multiple services. Similarly, one embodiment provides the user with the option to globally set his/her online status to "globally away" or "globally back." Each of the global functions may be provided within the IM application 202. The IM service interfaces 204, 206, and 208 may translate the global functions to service-specific functions, interpretable by each individual service 100, 108, and 210, respectively. Global functions may be provided as menu entries within the GUI menu structure (e.g., File), and/or may be triggered via certain specified hotkeys (e.g., CTRL+D=global disconnect, . . . etc).

Meta Contacts

In order to simplify the process of managing contacts from multiple IM accounts, one embodiment of the invention allows the user to set up a group of screen names which represent a single user. These groups will be referred to herein as "Meta Contacts." The process of creating and working with Meta Contacts will now be described with reference to FIGS. 6-9.

Figure 6:
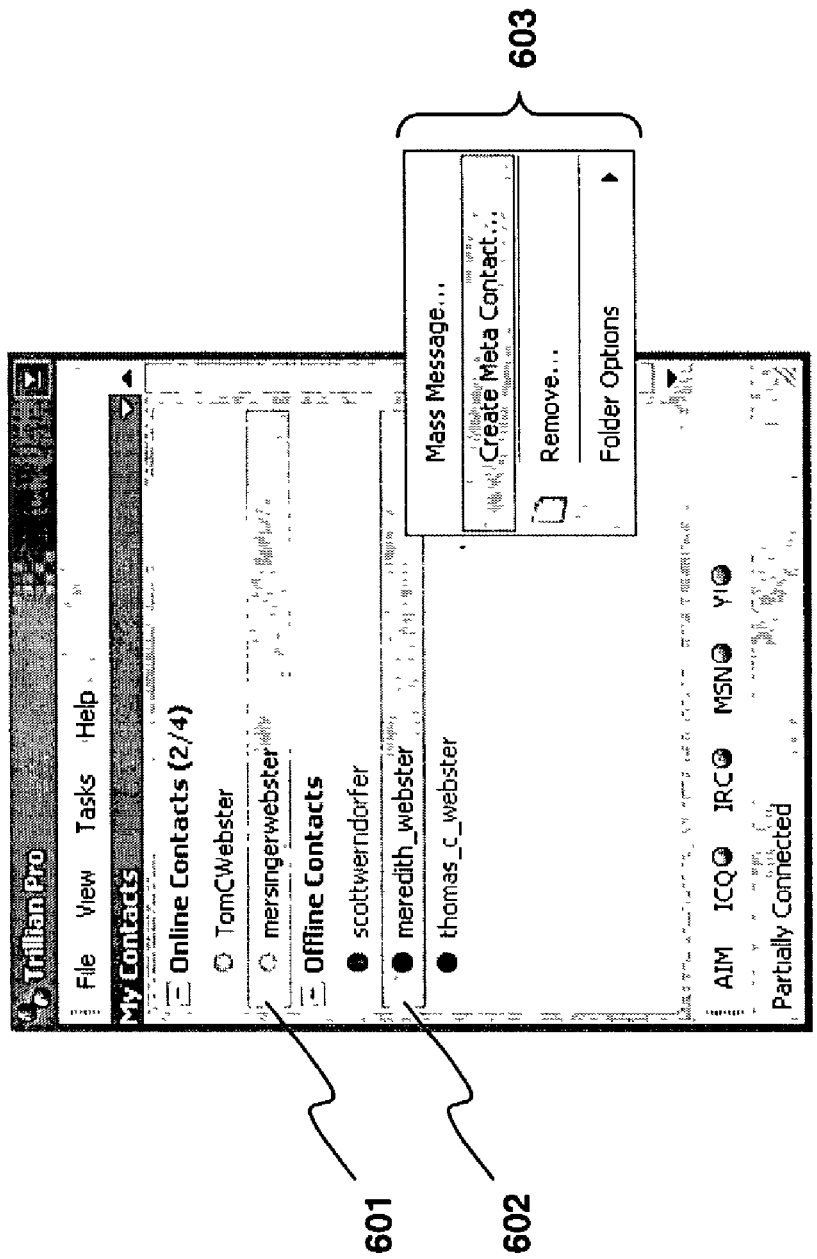
FIG. 6 illustrates the creation of a meta contact according to one embodiment of the invention.

Two of the contact names displayed in FIG. 6, "mersingerwebster" 601 and "meredith_webster" 602, represent the same individual on two different services (e.g., AOL and Yahoo!). In one embodiment of the invention, in order to combine these two contact names into a single Meta Contact, the user initially highlights both names and then right-clicks (i.e., select the right mouse button) on one of the highlighted names using a mouse pointer or other graphical input mechanism. Of course, various alternate input mechanisms (i.e., other than a "right-click") may be employed while still complying with the underlying principles of the invention. Right-clicking in this manner will bring up a menu 603, which includes an option to send a mass message or to create a Meta Contact. Selecting the Mass Message option allows the user to send an instant message to the group of highlighted contact names—in this case, the same individual. Selecting the Create Meta Contact option brings up a screen (not shown) in which the user is prompted to enter the name of the new Meta Contact.

Figure 7:
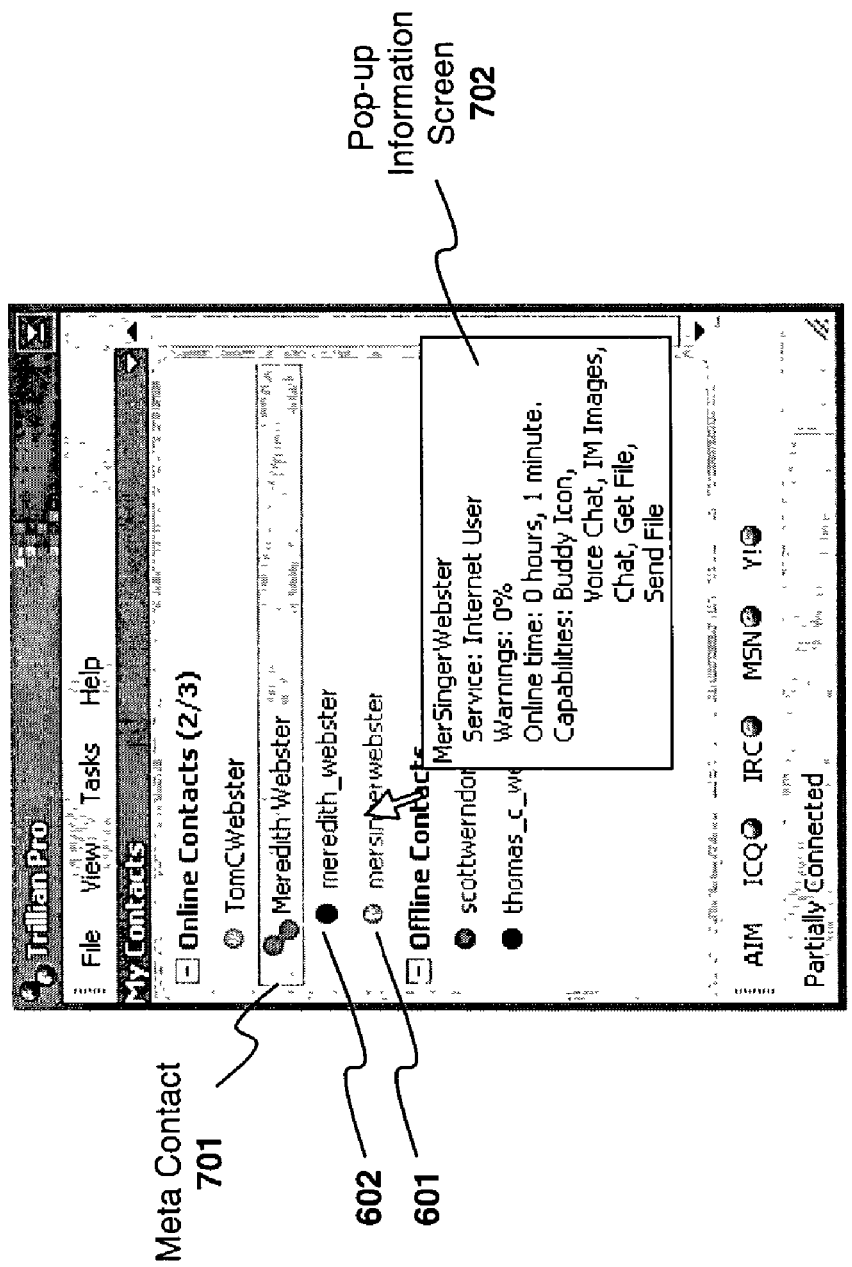
FIG. 7 illustrates a pop-up information screen associated with a meta contact.
Figure 8:
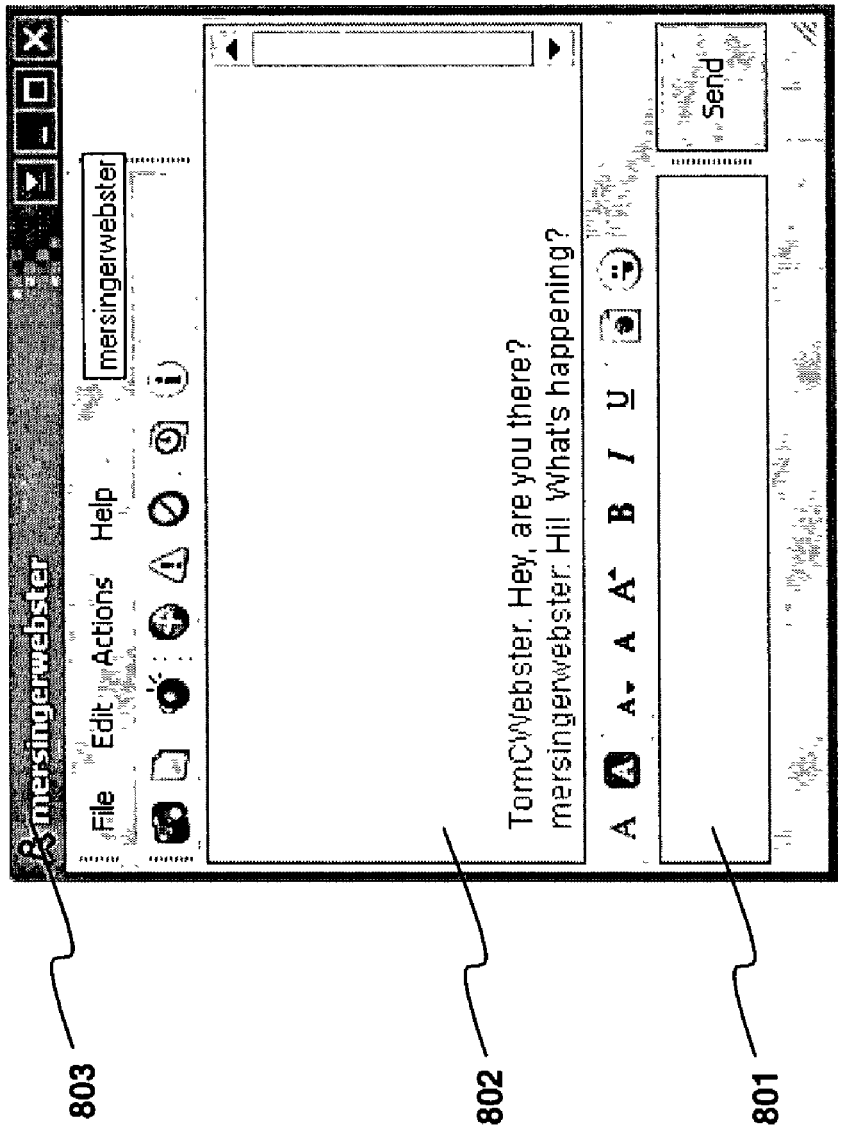
FIG. 8 illustrates an instant messaging text entry window according to one embodiment of the invention.

After the user enters the name for the new Meta Contact, the name "Meredith Webster" 701 appears in the user's buddy list as illustrated in FIG. 7. In one embodiment of the invention, as the user drags a mouse pointer (or other graphical selection element) over the Meta Contact 701, the individual contact names 601-602 appear beneath the Meta Contact as indicated. In addition, dragging the mouse pointer over one of the individual contact names then brings up a pop-up information screen 702 which displays information related to the contact including, by way of example but not limitation, the online status of the contact (e.g., how long the contact has been online) and the instant messaging features available to the contact (e.g., those supported by the contact's IM service). Various additional contact-related information may be provided in the pop-up information screen 702 while still complying with the underlying principles of the invention.

In one embodiment, to send an instant message to the individual represented by the Meta Contact 701, the user clicks on the Meta Contact 701 in the same manner as if the user were sending an instant message using a standard contact name. After clicking on the Meta Contact 701, a window such as that shown in FIG. 8 appears, comprised of a text entry region 801 in which the user may enter the instant message, and an IM conversation window 802 in which the complete IM conversation between the user and the selected contact appears.

In the illustrated example, only one of the two IM accounts organized within the Meta Contact 701 is selected for the IM session, as indicated in the title bar 803. In one embodiment of the invention, a user-configurable prioritization scheme is employed to determine which IM account 602, 601 (or group of accounts) within the Meta Contact 701 to select for the IM session. In one embodiment, the initial prioritization is based on the order in which the contact names 602, 601 appear under the Meta Contact heading 701. Using this scheme, the contact name "meredith_webster" 602 would be selected initially over the contact name "mersingerwebster" 601, with all other variables being equal. In one embodiment of the invention, the user may select and drag a contact name to a different position in the list to modify' the initial priority scheme (e.g., contact name 601 may be moved above contact name 602). It should be noted, however, that various alternate techniques for determining priority may be employed (i.e., other than mere positioning within the Meta Contact list) while still complying with the underlying principles of the invention.

In one embodiment, a relatively higher priority IM account will be passed over in favor of a relatively lower priority IM account if the user registered as "offline" on the higher priority account and "online" or "idle" on the lower priority account. Thus, in the example illustrated in FIG. 7, if contact 601 is registered online and contact 602 is offline, then contact 601 will be selected, notwithstanding the fact that it is positioned beneath contact 602 in the user's contact list. In one embodiment, any contact names registered as "online" with their respective IM services are highlighted to indicate an online status.

Various additional user-configurable Meta Contact parameters may be employed to select a particular contact name/IM account. For example, in one embodiment, the user may configure the system to transmit instant messages to any of the accounts on which the contact is registered as "online."

Figure 9:
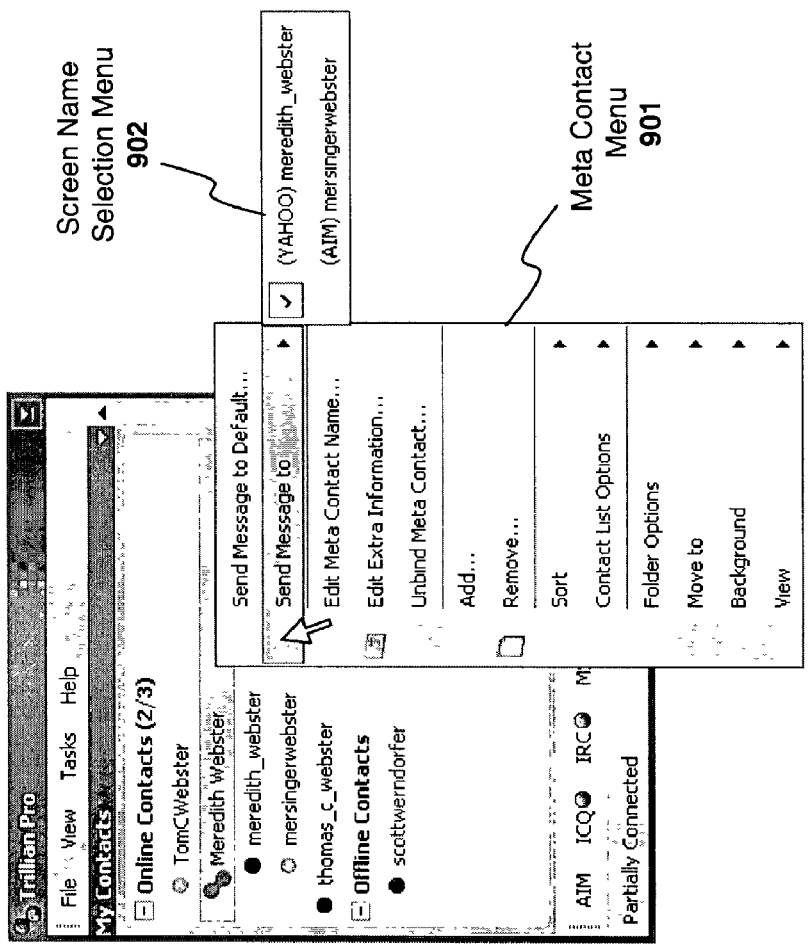
FIG. 9 illustrates a meta contact menu and a screen name selection menu employed in one embodiment of the invention.

As illustrated in FIG. 9, in one embodiment, the user may right click (or perform another designated input function) to bring up a Meta Contact control menu which allows the user to control/configure the various Meta Contact functions. The user may choose to send a message to the default contact within the Meta Contact list (e.g., using the prioritization scheme described above). Alternatively, the user may specify a particular contact name/IM account to which an instant message should be transmitted. This option (which is highlighted in FIG. 9), brings up a secondary window 902 which includes each of the Meta Contact names from which the user may manually select.

Other noteworthy options within the Meta Contact menu 901 include the ability to edit/add information related to the contact (e.g., in a text format). In one embodiment, this additional information will appear in the pop-up information screen 702 illustrated in FIG. 7. In addition, the Meta Contact menu 901 includes the option to sort contacts based on different variables (e.g., alphabetically, reverse alphabetically, based on medium, based on status, . . . etc); as well as the ability to modify various contact list options.

A logical architecture for implementing the Meta Contact features described above is illustrated generally in FIG. 10. A Meta Contact module 1000 logically groups a plurality of individual contact data objects 1001-1003, each of which represents an account on a different IM service. The Meta Contact module 1000 makes IM connection decisions 1020 based on a set of user-configurable prioritization rules 1010 (e.g., such as those described above with respect to FIGS. 6-9).

Figure 10:
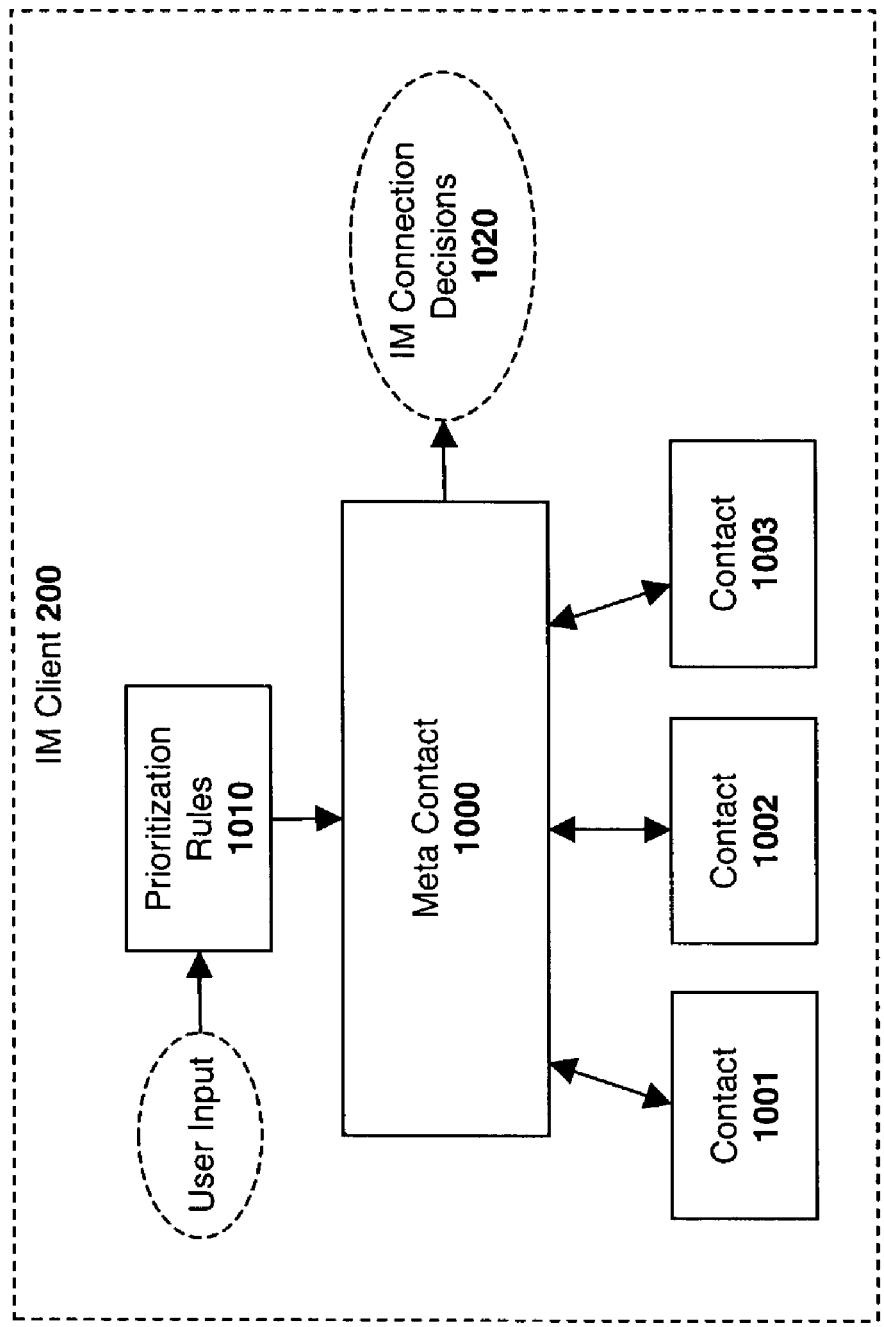
FIG. 10 illustrates one embodiment of a logical architecture for implementing meta contacts.

In one embodiment, the generalized architecture illustrated in FIG. 10, as well as the other instant messaging features described throughout this application, are implemented in software executed by a general purpose processor (e.g., an Intel Pentium®-class processor). More specifically, in one embodiment, the various IM features described herein are programmed using the Extensible Markup Language ("XML"). It should be noted, however, that the particular programming language employed is not pertinent to the underlying principles of the invention. Moreover, the invention may be embodied in hardware, software, firmware and/or any combination thereof.

Plugins, Sections and Aliasing

Figure 11:
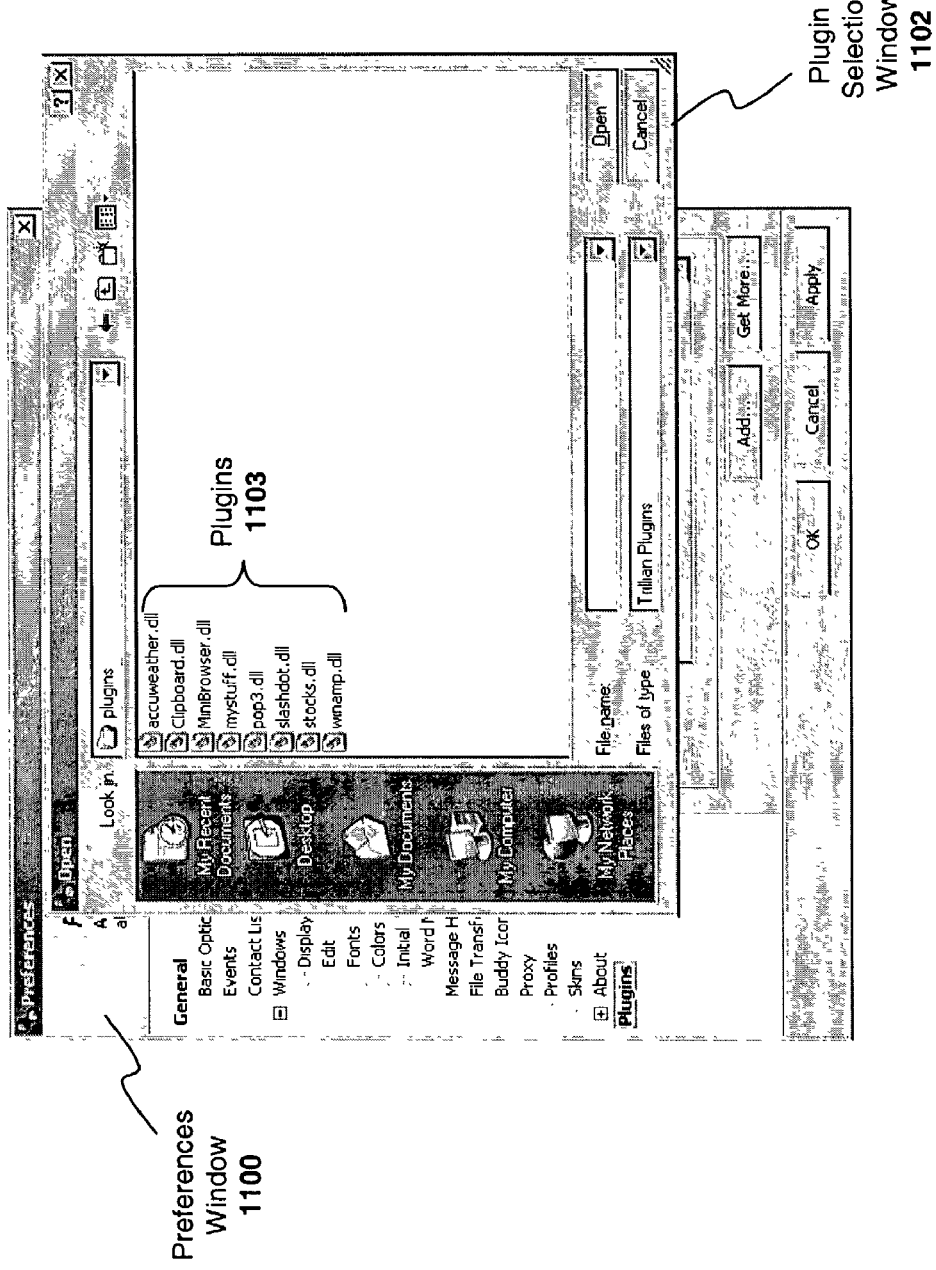
FIG. 11 illustrates a plugin selection window according to one embodiment of the invention.

One embodiment of the invention provides an application programming interface for plugins—i.e., supplemental programs which provide the primary IM client 200 with additional features. As illustrated in FIG. 11, new plugins 1103 may be installed via a plugin selection window 1102, generated by selecting the "plugins" option from the IM client's preferences window 1100.

Figure 12:
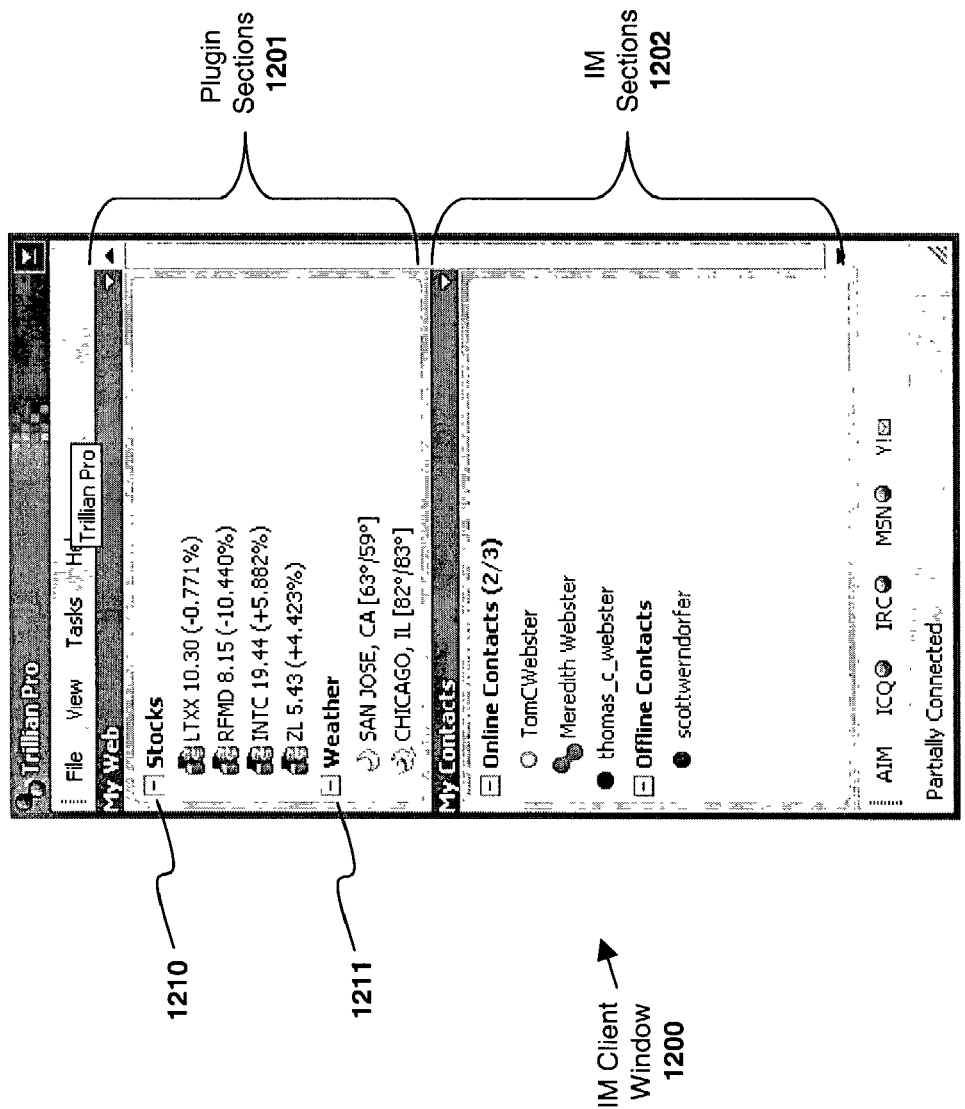
FIG. 12 illustrates plugin sections employed within an instant messaging client window.

As illustrated in FIG. 12, when new plugins are installed, sub-windows, referred to herein as "sections," are generated within the primary IM client window 1200. The plugin sections 1201 illustrated in FIG. 12 include a stock ticker 1210 and weather 1211. The particular stock information and weather forecast information to be collected by the IM client 200 are selected by the user at the time the plugin is installed or at any time thereafter. In one embodiment, once the user specifies the information to be displayed, the IM client 200 downloads and continually refreshes the information from a particular source on the Web (e.g., Yahoo!, Accuweather, . . . etc).

Figure 13:
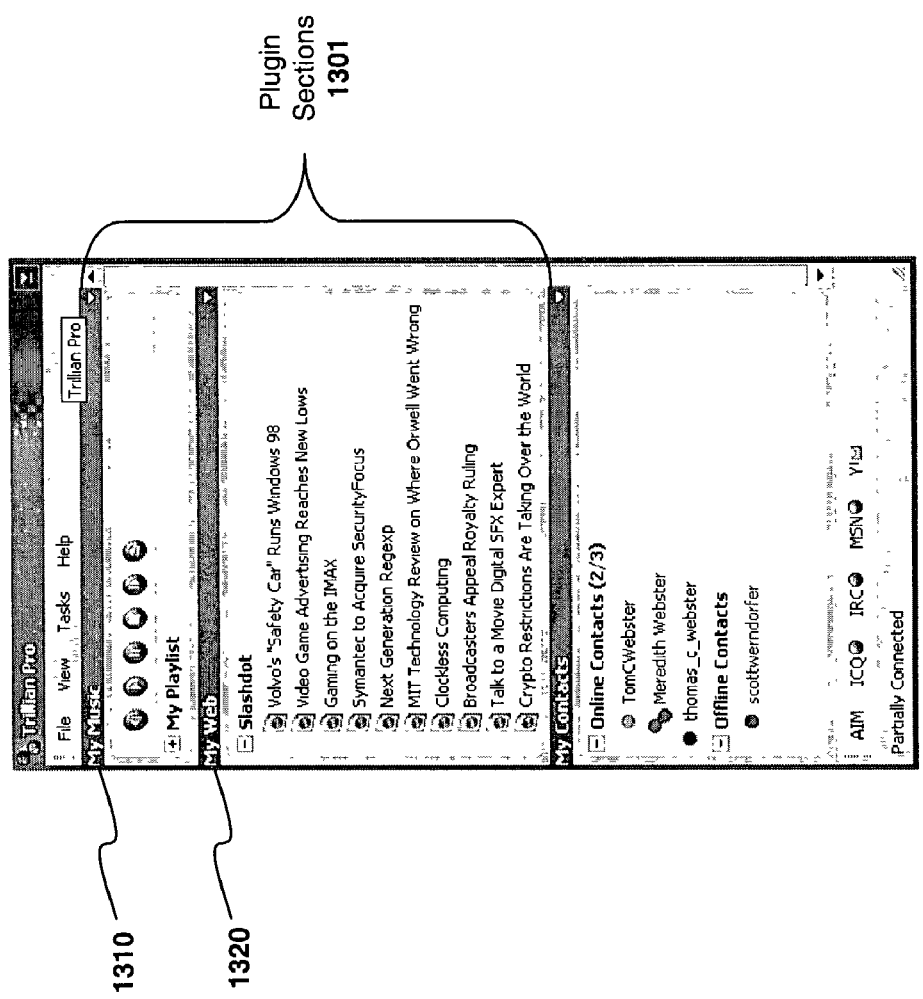
FIG. 13 illustrates additional plugin sections employed within the instant messaging client window.

FIG. 13 illustrates two additional types of plugins 1301. A news plugin 1320 continually retrieves up-to-date news headlines from a specified news source (e.g., a Web server) and a music plugin 1310 provides a graphical interface for playing/recording music selections via the IM client 200 (e.g., MP3 files). In one embodiment, the music plugin employs a third party music player to play/record the user's music selections such as, for example, Winamp.

Various additional plugin sections are contemplated within the scope of the present invention, including, for example, a mini Web browser section for browsing the Internet from within the IM client and a mail section for periodically downloading e-mail messages from the user's e-mail account (e.g., using the POP-3 protocol).

Figure 14:
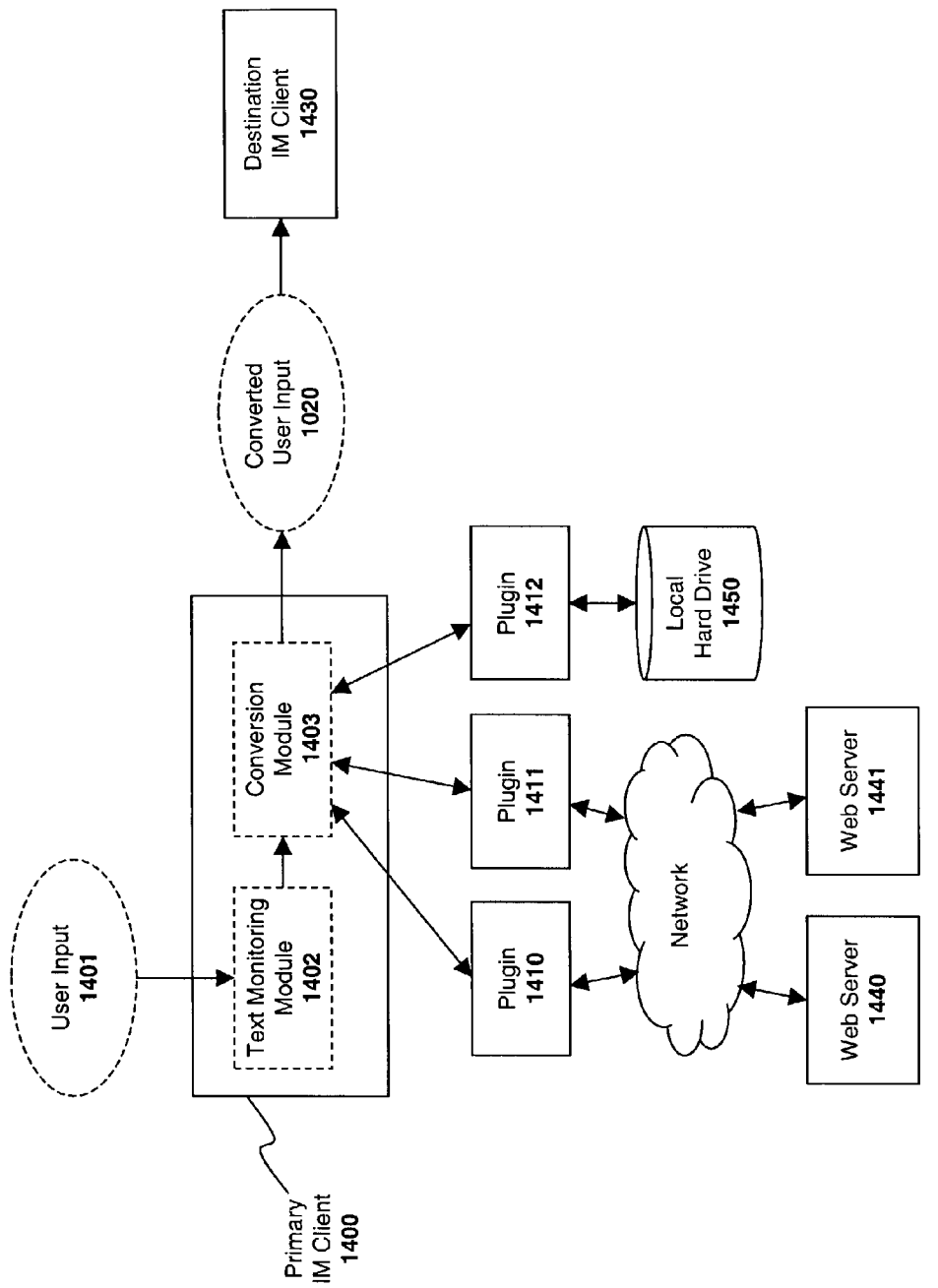
FIG. 14 illustrates an architecture for implementing aliases and word replacement according to one embodiment of the invention.
Figure 15:
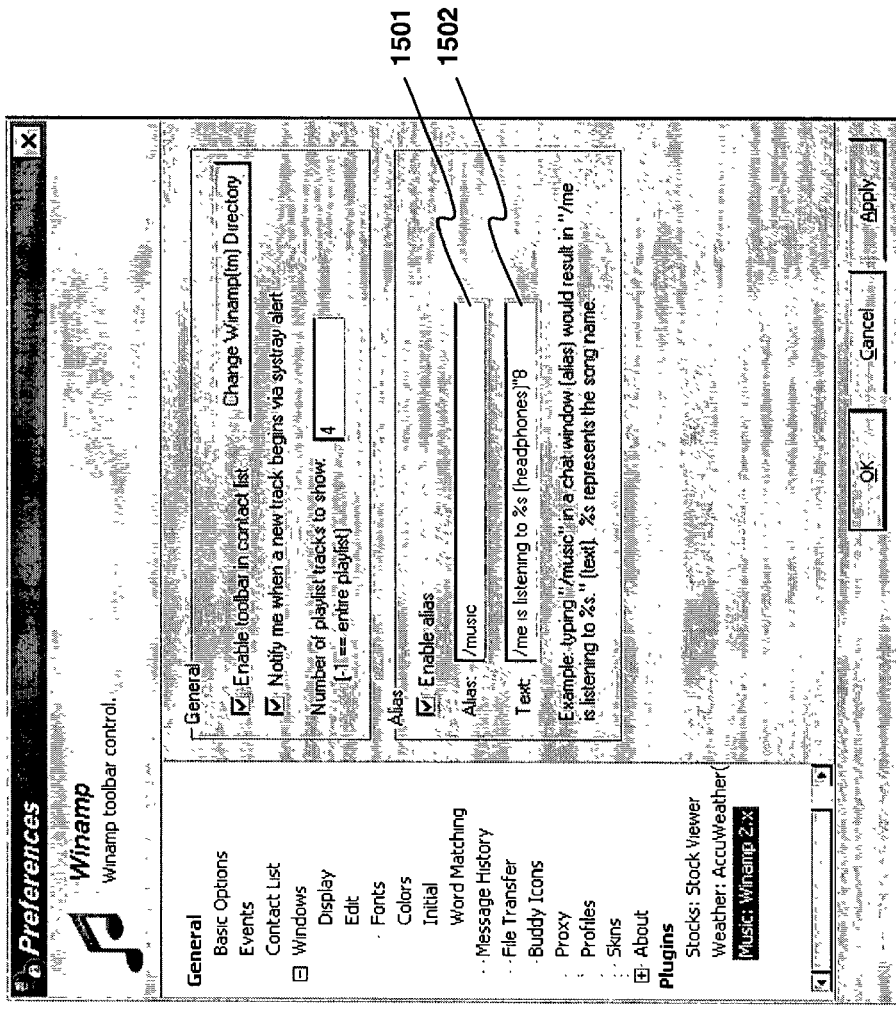
FIG. 15 illustrates a preferences window for entering alias settings according to one embodiment.

Referring now to FIGS. 14 and 15, in one embodiment, the user may direct the IM client 200 to transmit section-related information to a contact. As illustrated, plugins 1410-1412 may be configured to download and display user-specified information from Web servers 1440 and 1441, respectively. Plugin 1412 processes and displays information stored on a local hard drive 1450 (e.g., local music files). The underlying principles of the invention remain the same regardless of how/where the plugins acquire the user-specified information.

In addition, in the embodiment illustrated in FIG. 14, the primary IM client 1400 is comprised of a text monitoring module 1402 and a data conversion module 1403. The text monitoring module 1402 monitors the character sequences input by the user into the text entry region 801 of the IM window. Certain characters or groups of characters may be designated as control characters. When the text monitoring module 1402 detects a control character or a group of control characters, it triggers a content conversion module 1403 to modify/supplement the user's input in one or more specified ways, some examples of which are set forth below. The converted user input 1020 is then transmitted in an instant message to one or more destination IM clients 1430.

For example, in one embodiment, any characters which directly follow the "/" character are interpreted by the text monitoring module 1402 as an "alias." As used herein, an alias identifies data maintained by one of the plugins 1410-1412, which is then inserted into the instant message by the content conversion module 1403. For example, as indicated in data fields 1501 and 1502 in FIG. 15, when the text monitoring module detects the alias "/music," it triggers the content conversion module 1403 which replaces "/music" with the string of text "/me is listening to % s." The content conversion module then replaces "/me" with the user's name and "% s" with the name of the MP3 track (or other type of music track) that the user is currently listening to (e.g., "Meredith Webster is listening to Tangerine"). The name of the MP3 track is extracted from the music plugin (e.g., plugin 1412) installed and executed on the IM client 200. Additional aliases may be created to transmit various user-specified data to IM recipients (e.g., "/news" to indicate a news story, "/stock" to transmit stock quotes for the user's portfolio, "/video" to indicate the program that the user is currently watching, . . . etc). It should be noted, however, that the underlying principles of the invention are not limited to any particular type of alias or any particular type of user-specified data.

In addition to (or in lieu of) using "aliases," the user may configure the IM client to reformat and/or replace various specified character strings. For example, when the user types his/her screen name, he/she may want it to appear in bolded or italicized characters. Similarly, the user may want to trigger some sort of event in response to a particular character string (e.g., playing of a .WAV file, execution of a program, . . . etc).

Figure 16:
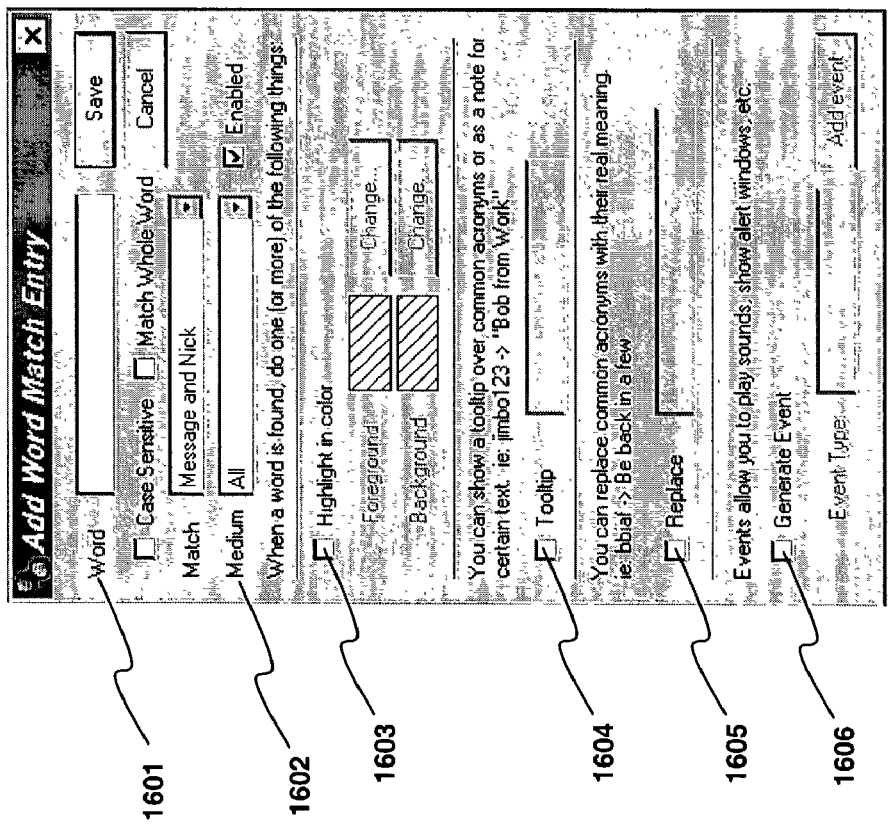
FIG. 16 illustrates a window for entering word match settings according to one embodiment of the invention.

FIG. 16 illustrates one embodiment of a word match configuration window for performing these and other character formatting/substitution functions. The user may specify a character string via input field 1601. Upon detecting the specified character string, the text monitoring module 1402 will trigger the content conversion module 1403 to perform one or more actions, as specified in the remaining data fields. In data field 1602, the user may specify that the word match functions only apply to certain IM services. The default position is "All" wherein the word match functions are applied in the same manner for each service.

Selection box 1603 allows the user to specify a background and foreground highlight color for the selected text. Selection box 1604 allows the user to specify a tooltip note to be displayed above the character string. Selection box 1605 allows the user to enter a character string to be used in place of the input character string. For example, the user's real name may be substituted for his/her screen name and certain acronyms may be replaced with the character string represented by the acronym (e.g., BTW="By the way").

Figure 17:
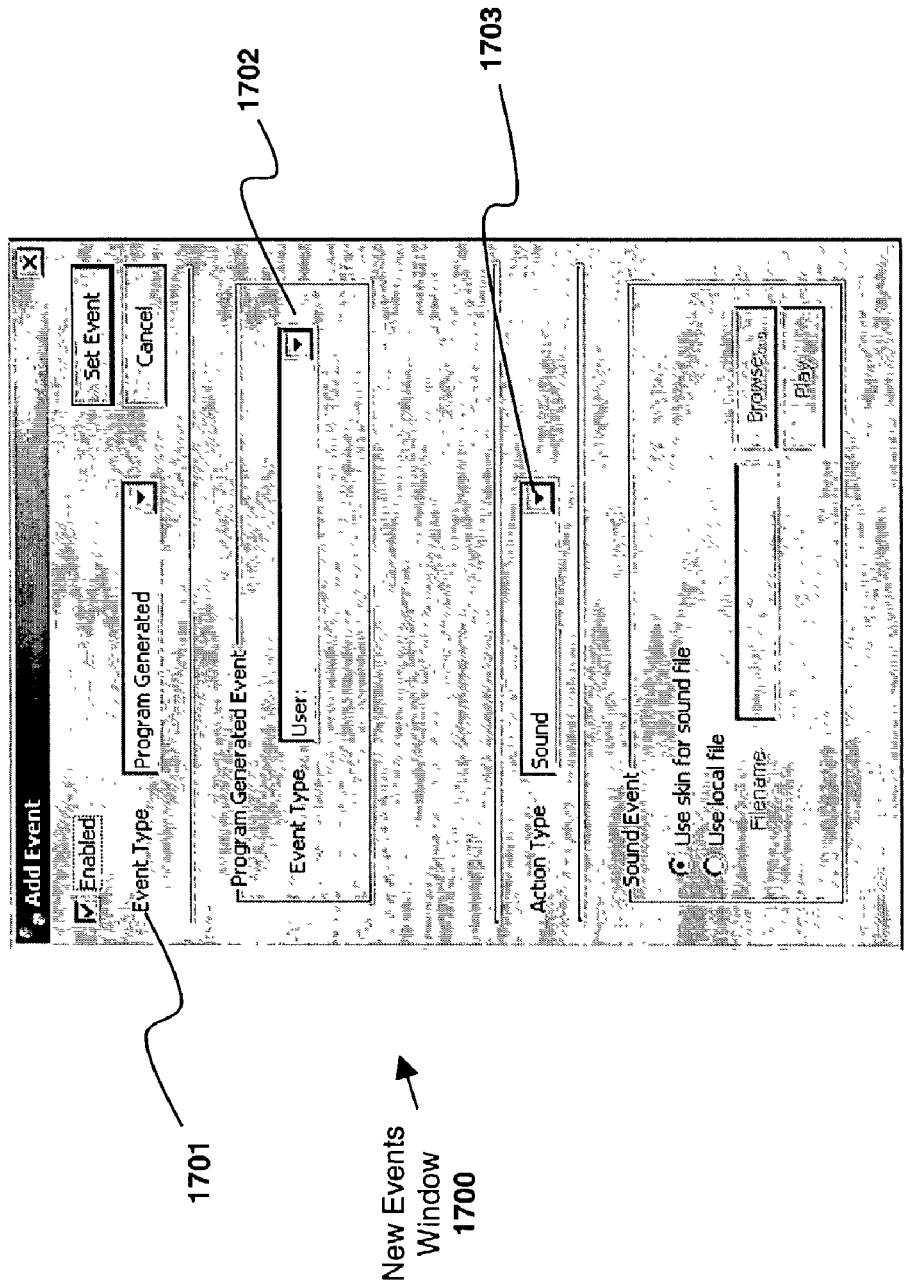
FIG. 17 illustrates an input window for adding events according to one embodiment of the invention.

Finally, at 1606, the user may specify an event that will be triggered as a result of the text monitoring module identifying the specified character string. Events may be programmed via the events window 1700 shown in FIG. 17. A variety of different events may be triggered in response to a particular character string including, by way of example but not limitation, generating a specified sound (e.g., identified as a .WAV file stored on a local storage device); executing a specified program or a specified program action (e.g., opening a picture of an individual identified by the character string); generating an alert window or a Systray alert (i.e., an alert appearing in the Windows system tray); and/or setting a user status (e.g., online to offline). Various other events may be programmed in response to specified character strings while still complying with the underlying principles of the invention.

Event System

Figure 20:
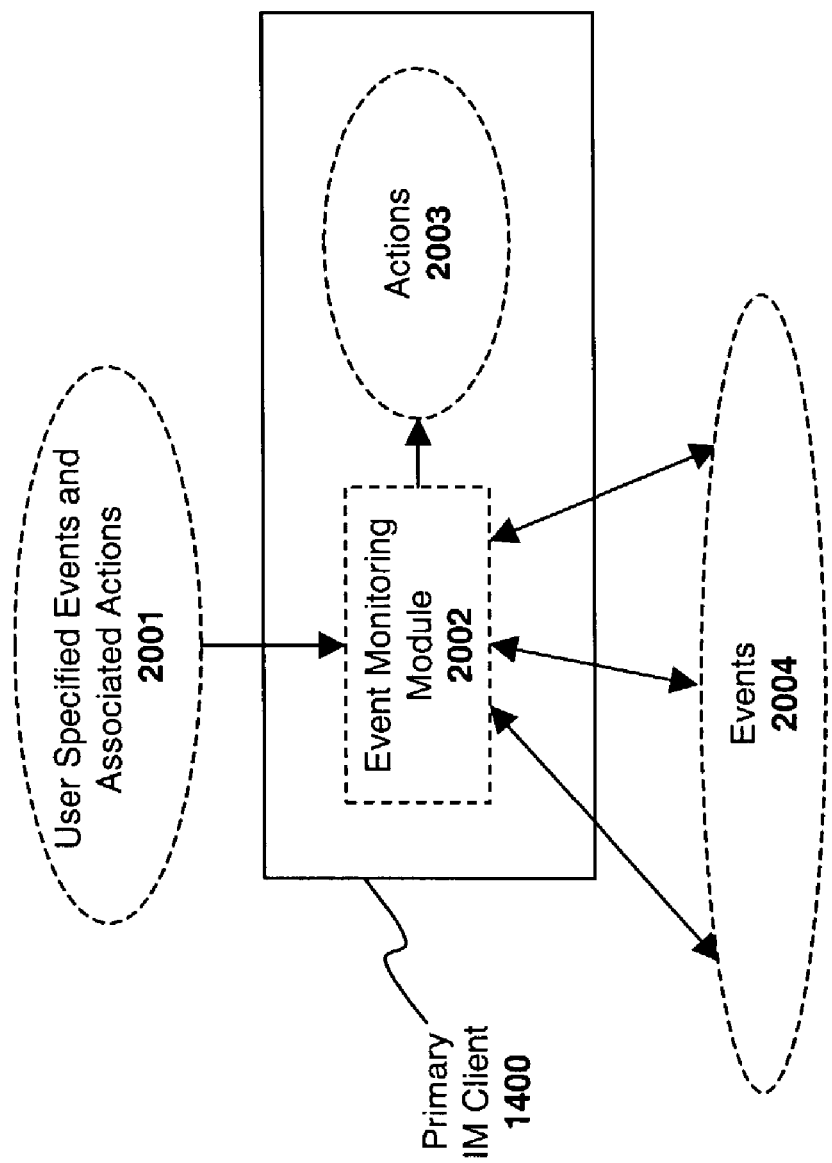
FIG. 20 illustrates an event monitoring module according to one embodiment of the invention.

In addition to the event-based features described above with respect to the receipt of character strings, one embodiment of the invention employs a comprehensive event system for generating virtually any type of program action in response to virtually any type of events. One embodiment of the event system is illustrated generally in FIG. 20 in which, after a user specifies a set of events and associated actions 2001, an event monitoring module 2002 continually monitors the IM client 1400 to detect any of the specified events 2004. In response to detecting an event, the event monitoring module 2002 generates the specified action 2003 associated with that event.

Figure 18:
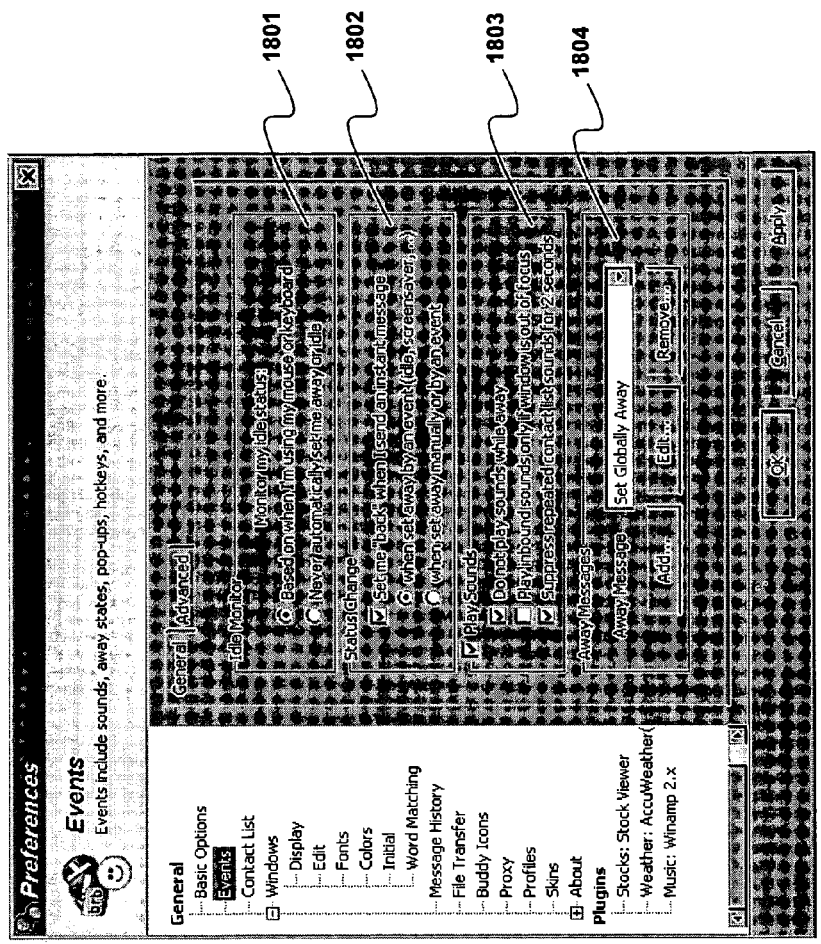
FIG. 18 illustrates a general events window according to one embodiment of the invention.
Figure 19:
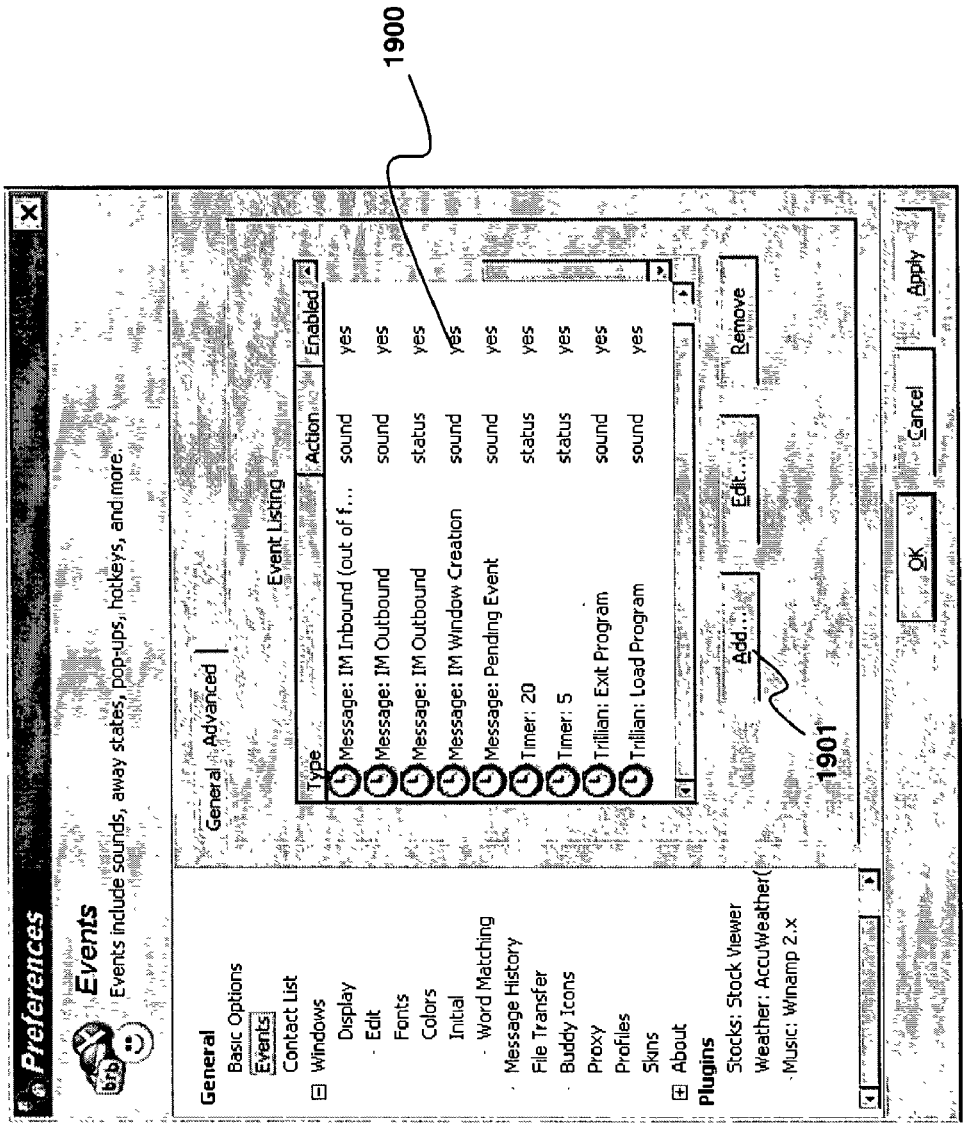
FIG. 19 illustrates an advanced events window according to one embodiment of the invention.

Two types of event selection windows are provided in the illustrated embodiment. A general event window is illustrated in FIG. 18 and an advanced event window is illustrated in FIG. 19. The general event window provides users with access to the most commonly-specified event types. For example, in region 1801, the user may configure the system to modify the user's status based on whether the user is actively using the mouse or keyboard. In one embodiment, if this option is selected, the user's status will change to "idle" after a first period of inactivity (e.g., 5 minutes) and then "offline" after a second specified period of inactivity (e.g., 20 minutes). The first and second periods of inactivity may also be specified by the user.

Figure 21:
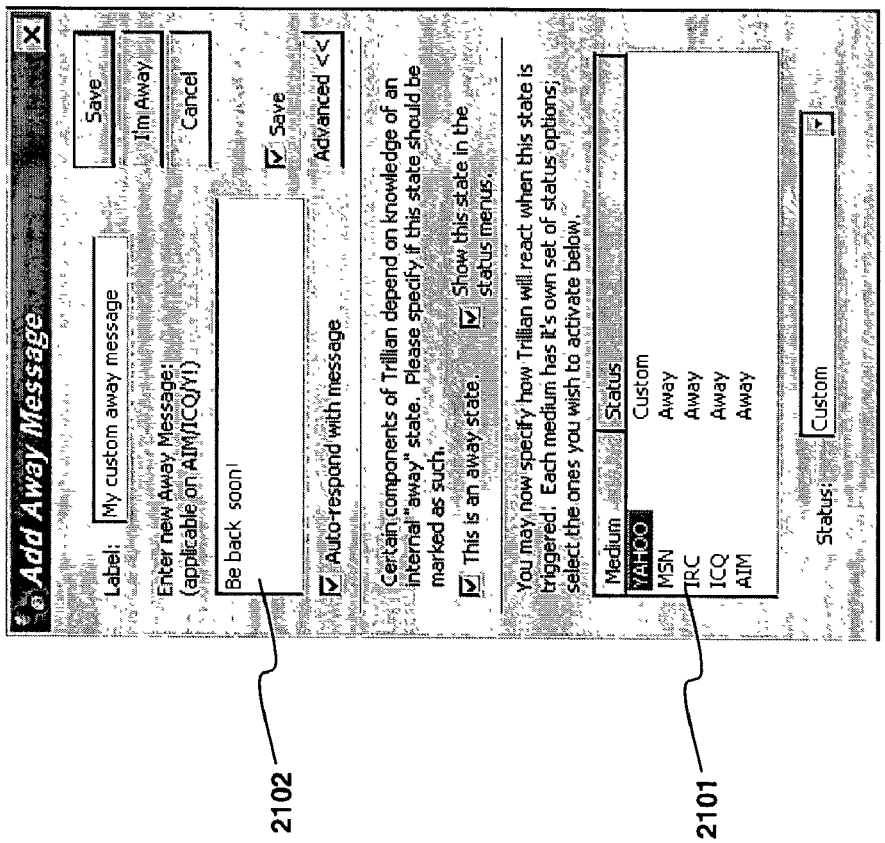
FIG. 21 illustrates a window for selecting default away messages or entering custom away messages according to one embodiment.

In region 1802, the user may select conditions under which the user's status should be set back to "online" (e.g., either when set away manually or by an event, or only when set away by an event). Region 1803 allows the user to configure various sound generation actions (as indicated) and region 1804 allows the user to customize away messages. In one embodiment, choosing to add a new away message brings up the window illustrated in FIG. 21. In region 2101, the user may specify that, for some IM services, the services' standard away message should be used whereas, for other IM services (e.g., Yahoo!, in the example) a customized away message should be used. The customized away message may be entered in region 2102, as illustrated.

FIG. 19 illustrates an advanced event window according to one embodiment of the invention. The event list shown in region 1900 displays each of the events programmed within the event monitoring module 2002, organized by event type. Associated with each event is a particular action as well as an indication as to whether the event is enabled. Selecting the add button 1901 brings up the new events window in FIG. 17.

In one embodiment of the invention, the following event types (1701) are supported: program generated events, idle time events, hotkey events, and scheduled events. Program generated events (1702) are events triggered by any function performed by the IM client 1400 or another external client/program. For example, a user may program the system to perform an action in response to the receipt of either a new instant message (internal) or a new e-mail message (external). In one embodiment, the user may program the event monitoring module 2002 to set the user's status as "offline" when the user's screen saver triggers.

Idle time events are events triggered after a predetermined amount of time that the user is inactive (e.g., not manipulating the mouse or keyboard). Hotkey events are triggered in response to the selection of a specified key or set of keys while the IM client is running (e.g., CTRL+M=create new instant messaging session). Finally, in one embodiment of the invention a scheduler is provided which allows the user to schedule actions at specified dates and times. The user may program the actions associated with scheduled events to trigger only once, daily, weekly, business weekly (e.g., Monday through Friday), monthly or yearly, to name just a few options.

As mentioned above, for each specified event, various types of actions may be selected within the action type region 1703 including, but not limited to, generating a specified sound (e.g., from a .WAV file), executing a specified program (e.g., by identifying an executable file), generating an alert window or a Systray alert, and/or modifying the user's status. Once a new event and associated action is added to the system, it appears within the event list in region 1900.

Embodiments of the invention may include various steps as set forth above. The steps may be embodied in machine-executable instructions which cause a general-purpose or special-purpose processor to perform certain steps (e.g., on a client computer). Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, or other type of media/machine-readable medium suitable for storing electronic instructions. For example, the present invention may be downloaded as a computer program which may be transferred from a remote computer (e.g., a server) to a requesting computer (e.g., a client).

Throughout the foregoing description, for the purposes of explanation, numerous specific details were set forth in order to provide a thorough understanding of the invention. It will be apparent, however, to one skilled in the art that the invention may be practiced without some of these specific details. For example, while the embodiments of the invention described above focus on a specific graphical user interface implementation for the IM client, various alternate interface types may be employed including text-based interfaces. In addition, although a client-based implementation is described above, a server-based implementation (or other distributed computing implementation) is also contemplated within the scope of the present invention. Accordingly, the scope and spirit of the invention should be judged in terms of the claims which follow.

What is claimed is:

1. A computer-implemented method comprising:
   categorizing two or more instant messaging contact names for a single individual into a single meta contact wherein said two or more instant messaging contact names are associated with different instant messaging services;
   causing the meta contact to be displayed in a contact list, wherein the contact list includes a first section identifying individuals registered as "online" and a second section identifying individuals registered as "offline," and wherein said meta contact is displayed in the first section of a contact list when one of the two or more instant messaging contact names registers as "online" even though a different one of the two or more instant messaging contact names registers as "offline;"
   causing other instant messaging contact names to be displayed alongside the meta contact in the contact list, wherein the other instant messaging contact names are not categorized into meta contacts;
   receiving a request from a sending user to transmit an instant message directed to said meta contact; and
   selecting one of the two or more instant messaging contact names within said meta contact to which to transmit said instant message based on a specified prioritization scheme configurable by the sending user, wherein said prioritization scheme is based on an order in which said instant messaging contact names appear within a meta contact list and wherein said order is graphically displayed beneath said meta contact within an instant messaging contact list.

2. The method as in claim 1 further comprising:
   opening an instant messaging session with said one selected instant messaging contact name.

3. The method as in claim 1 wherein categorizing comprises concurrently highlighting said two or more instant messaging contact names and generating a command to create said meta contact.

4. The method as in claim 3 wherein said command to generate said meta contact is generated by right-clicking a mouse to generate a menu and selecting an option from said menu.

5. The method as in claim 1 wherein selecting based on said prioritization scheme further comprises:
   selecting a first contact name which appears relatively lower in said order than a second contact name if said first contact name is registered on its respective instant messaging service as "online" whereas said second contact name is registered on its respective instant messaging service as "offline."

6. The method as in claim 1 wherein selecting based on said prioritization scheme further comprises:
   selecting a first contact name which appears relatively lower in said order than a second contact name if said first contact name is registered on its respective instant messaging service as "idle" whereas said second contact name is registered on its respective instant messaging service as "offline."

7. An instant messaging graphical user interface (GUI) comprising:
   a contact list including at least one meta contact entry, said meta contact entry representing two or more different instant messaging contact names for the same individual, said meta contact entry selectable via a mouse pointer or other cursor control device, wherein said two or more different instant messaging contact names are associated with different instant messaging services, and wherein the contact list has a first section identifying individuals registered as "online" and a second section identifying individuals registered as "offline," and the meta contact entry is in the first section when one of the two or more different instant messaging contact names registers as "online" even though a different one of the two or more different contact names registers as "offline,"
   wherein, upon receiving a selection of said meta contact entry by a user, an instant messaging session is initiated with one of said two or more different contact names based on a specified prioritization scheme configurable by the user, wherein said prioritization scheme comprises an order in which said contact names appear beneath said meta contact entry.

8. The GUI as in claim 7 wherein said two or more contact names appear as said mouse pointer or other cursor control device is passed over said meta contact entry.

9. The GUI as in claim 7 wherein, as said mouse pointer or other cursor control device is passed over each of said two or more contact names, information related to each of said contact names appears in a pop-up window.

10. The GUI as in claim 7 wherein each of said contact names registered as being online on its respective instant messaging service is highlighted to indicate an online status.

11. The GUI as in claim 7 wherein said meta contact entry is generated in response to receiving input indicating concurrent highlighting of said two or more contact names within said contact list and selection of a command to create said meta contact entry.

12. The GUI as in claim 11 wherein access to said command is provided in response to receiving input indicating right-clicking of a mouse.

13. A machine readable medium storing instructions which when executed by a machine causes the machine to perform operations comprising:
   grouping instant messaging (IM) contact names of a single individual into a meta contact, each IM contact name representing a different IM account of the individual;
   providing an order for the IM contact names to be graphically displayed beneath the meta contact;
   providing a contact list having a first section identifying individuals registered as "online" and a second section identifying individuals registered as "offline," wherein the meta contact is graphically displayed in the first section when one of said IM contact names registers as "online" even though a different one of said IM contact names registers as "offline;"
   receiving a selection of the meta contact, the selection indicating a request to initiate an IM session with the individual;
   in response to the selection of the meta contact, automatically selecting one of the IM contact names within the meta contact with which to initiate the IM session, wherein automatically selecting includes selecting a first IM contact name lower in the order than a second IM contact name when the first IM contact name registers as idle and the second IM contact name registers as offline; and
   wherein a first IM account of the individual is associated with a first IM service, a second IM account of the individual is associated with a second IM service, and the first IM service uses a different protocol to transmit an instant message than the second IM service.

14. The medium of claim 13, wherein the grouping is in response to receiving from a graphical input mechanism a selection of the contact names.

15. The medium of claim 13, wherein the operations further comprise:
   displaying in a GUI the IM contact names in said order beneath the meta contact.

16. The medium of claim 13, wherein automatically selecting further includes selecting a third IM contact name lower in the order than the second IM contact name when the third IM contact name registers as online and the second IM contact name registers as offline.

17. The medium of claim 13, wherein the operations further comprise:
   after the IM session is initiated with the IM contact name, receiving an instant message to be transmitted to the individual.

18. The medium of claim 13, wherein the operations further comprise:
   receiving an instant message to be transmitted to the individual and transmitting the instant message using any IM contact name within the meta contact registering as online.

* * * * *